United States Patent
Poyil et al.

(10) Patent No.: US 8,965,132 B2
(45) Date of Patent: Feb. 24, 2015

(54) EDGE TRACING WITH HYSTERESIS THRESHOLDING

(75) Inventors: Bijesh Poyil, Bangalore (IN); Anil Sripadarao, Bangalore (IN)

(73) Assignee: Analog Devices Technology, Hamilton (BM)

(*) Notice: Subject to any disclaimer, the term of this patent is extended or adjusted under 35 U.S.C. 154(b) by 267 days.

(21) Appl. No.: 13/426,844

(22) Filed: Mar. 22, 2012

(65) Prior Publication Data

US 2013/0129225 A1 May 23, 2013

Related U.S. Application Data

(60) Provisional application No. 61/561,495, filed on Nov. 18, 2011.

(51) Int. Cl.
*G06K 9/48* (2006.01)
*G06T 7/00* (2006.01)

(52) U.S. Cl.
CPC ..... *G06T 7/0085* (2013.01); *G06T 2207/20072* (2013.01); *G06T 2207/20136* (2013.01); *G06T 2207/20141* (2013.01)
USPC ....................................................... 382/199

(58) Field of Classification Search
USPC ....................................................... 382/199
See application file for complete search history.

(56) References Cited

U.S. PATENT DOCUMENTS

| | | | |
|---|---|---|---|
| 4,590,520 A | 5/1986 | Frame et al. | |
| 4,910,786 A * | 3/1990 | Eichel | 382/199 |
| 5,245,677 A | 9/1993 | Lepore et al. | |
| 5,420,917 A * | 5/1995 | Guzman | 379/279 |
| 5,659,636 A | 8/1997 | Maeda et al. | |
| 5,715,331 A | 2/1998 | Hollinger | |
| 5,767,978 A | 6/1998 | Revankar et al. | |
| 5,809,169 A * | 9/1998 | Rezzouk et al. | 382/199 |
| 5,870,495 A | 2/1999 | Mancuso et al. | |
| 6,151,424 A | 11/2000 | Hsu | |
| 6,608,942 B1 | 8/2003 | Le | |
| 6,798,910 B1 | 9/2004 | Wilson | |
| 7,450,268 B2 | 11/2008 | Martinez et al. | |
| 7,466,871 B2 | 12/2008 | Hosoda et al. | |
| 7,680,303 B2 | 3/2010 | Porikli et al. | |
| 7,953,290 B2 * | 5/2011 | Ulrich et al. | 382/266 |
| 8,290,228 B2 * | 10/2012 | Cohen et al. | 382/128 |
| 8,538,163 B2 * | 9/2013 | Moesle et al. | 382/199 |
| 2008/0080009 A1 | 4/2008 | Masui et al. | |
| 2011/0081087 A1 | 4/2011 | Moore | |
| 2011/0085735 A1 | 4/2011 | Malik | |
| 2013/0129225 A1* | 5/2013 | Poyil et al. | 382/199 |

OTHER PUBLICATIONS

International Search Report and Written Opinion for International Application No. PCT/US2012/065160, issued on Feb. 21, 2013 and mailed Mar. 1, 2013.

(Continued)

*Primary Examiner* — Stephen R Koziol
*Assistant Examiner* — Totam Le
(74) *Attorney, Agent, or Firm* — Patent Capital Group

(57) ABSTRACT

A method for tracing edges of an image using hysteresis thresholding includes: (i) receiving an edge map of the image, (ii) scanning one row of the input edge map, (iii) assigning a label to each edge pixel in the row based at least in part on the presence or absence of a neighboring edge pixel, (iv) grouping contiguous labels, and (v) identifying groups of edge pixels.

24 Claims, 13 Drawing Sheets

(56) References Cited

OTHER PUBLICATIONS

Arthur Nowakowski et al. "Fast computation of thresholding hysteresis for edge detection", Proceedings of Spie, Mar. 6, 2006, pp. 615948-615948-7, XP055054090, ISSN: 0277-786X, DOI: 10.1117/12.674959 abstract sections 6-8, figures 4, 7.

Trost et al. "Design of real-time edge detection circuits on multi-FPGA prototyping system", International Conference Electrical and Electronics Engineering, Dec. 1, 1999, pp. 385-389, XP009167209, abstract sections 2, 3.

Gang Liu et al, "Two practical issues in canny's edge detector implementation", Pattern Recognition, 2000. Proceedings. 15th International Conference on Sep. 3-7, 2000; [Proceedings of the International Conference on Pattern Recognition. (ICPR)], Los Alamitos, CA, USA, IEEE Comput. SOC, US, vol. 3, Sep. 3, 2000, pp. 676-678, XP010533378, DOI: 10.1109/ICPR.2000.903635 ISBN: 978-0-7695-0750-7 abstract section 3.

Mayssaa Al Najjar et al. "A compact single-pass architecture for hysteresis thresholding and component labeling", International Conf. on Image Processing (ICIP 2010), USA, Sep. 26, 2010, pp. 101-104, XP031814093, ISBN: 978-1-4244-7992-4 abstract section 3, figure 1.

L Shapiro et al. "Binary Image Analysis", Computer Vision, Mar. 1, 2000, pp. 1-43, XP055054089, Retreived from the Internet: URL:http://www.cs.washington.edu/education/courses/cse576/book/ch3.pdf [retrieved on Feb. 20, 2013] section 3.4.

\* cited by examiner

500 ⌐

| LABEL | 0 | 1 | 2 | 3 | 4 | 5 | ~520 |
|---|---|---|---|---|---|---|---|
| ROOT | 0 | 0 | 1 | 0 | 0 | 4 | ~530 |

| 0  | 0  | 0  | 0  | 0  | 0  | 0  | FF | 0  | 0  | 0  | 0  | 0  | 0  | 0  | 0  |
|----|----|----|----|----|----|----|----|----|----|----|----|----|----|----|----|
| FF | FF | FF | FF | FF | FF | FF | FF | 0  | 0  | 0  | 0  | 0  | 0  | 0  | 0  |
| 0  | 0  | 0  | 0  | 0  | 0  | 0  | FF | 0  | 0  | 0  | 0  | 0  | 0  | 0  | 0  |
| 0  | 0  | 0  | 0  | 0  | 0  | 0  | FF | 0  | 0  | 0  | 0  | 0  | 0  | 0  | 0  |
| 0  | 0  | 0  | 0  | 0  | 0  | 0  | FF | 0  | 0  | 0  | 0  | 0  | 0  | 0  | 0  |
| 0  | 0  | 0  | 0  | 0  | 0  | 0  | 0  | FF | FF | FF | FF | FF | FF | FF | FF |
| 0  | 0  | 0  | 0  | 0  | 0  | 0  | 0  | 0  | 0  | 0  | 0  | 0  | 0  | 0  | 0  |
| 0  | 0  | 0  | 0  | 0  | 0  | 0  | 0  | 0  | 0  | 0  | 0  | 0  | 0  | 0  | 0  |
| 0  | 0  | 0  | 0  | 0  | 0  | 0  | 0  | 0  | 0  | 0  | 0  | 0  | 0  | 0  | 0  |
| 0  | 0  | 0  | 0  | 0  | 0  | 0  | 0  | 0  | 0  | 0  | 0  | 0  | 0  | 0  | 0  |
| 0  | 0  | 0  | 0  | 0  | 0  | 0  | 0  | FF | FF | FF | FF | FF | FF | FF | FF |
| 0  | 0  | 0  | 0  | 0  | 0  | 0  | FF | 0  | 0  | 0  | 0  | 0  | 0  | 0  | 0  |
| 0  | 0  | 0  | 0  | 0  | 0  | 0  | FF | 0  | 0  | 0  | 0  | 0  | 0  | 0  | 0  |
| 0  | 0  | 0  | 0  | 0  | 0  | 0  | FF | 0  | 0  | 0  | 0  | 0  | 0  | 0  | 0  |
| 0  | 0  | 0  | 0  | 0  | 0  | 0  | FF | 0  | 0  | 0  | 0  | 0  | 0  | 0  | 0  |
| FF | FF | FF | FF | FF | FF | FF | FF | 0  | 0  | 0  | 0  | 0  | 0  | 0  | 0  |

FIG. 8B

| | | | | | | | | | | | |
|---|---|---|---|---|---|---|---|---|---|---|---|
| 0 | A | A | 0 | 0 | 0 | A | A | 0 | 0 | A | A |
| B | 0 | 0 | 0 | A | 0 | 0 | B | 0 | 0 | 0 | B |
| B | B | B | 0 | 0 | FF | FF | 0 | 0 | A | 0 | B |
| 0 | 0 | B | 0 | 0 | 0 | 0 | FF | FF | 0 | 0 | B |
| 0 | 0 | 0 | FF | FF | FF | FF | 0 | FF | FF | 0 | B |
| 0 | 0 | 0 | 0 | 0 | 0 | 0 | 0 | 0 | FF | FF | 0 |
| 0 | A | A | 0 | 0 | 0 | A | A | 0 | 0 | FF | FF |
| B | 0 | 0 | 0 | A | 0 | 0 | B | 0 | 0 | 0 | FF |
| B | B | B | 0 | 0 | B | B | 0 | 0 | A | 0 | FF |
| 0 | 0 | B | 0 | 0 | 0 | 0 | B | B | 0 | 0 | FF |
| 0 | 0 | 0 | B | B | B | B | 0 | B | B | 0 | FF |
| 0 | 0 | 0 | 0 | 0 | 0 | 0 | 0 | FF | FF | FF | 0 |

| | | | | | | | | | | | |
|---|---|---|---|---|---|---|---|---|---|---|---|
| 0 | FF | FF | 0 | 0 | 0 | FF | FF | 0 | 0 | FF | FF |
| FF | 0 | 0 | 0 | FF | 0 | 0 | FF | 0 | 0 | 0 | FF |
| FF | FF | FF | 0 | 0 | FF | FF | 0 | 0 | FF | 0 | FF |
| 0 | 0 | FF | 0 | 0 | 0 | 0 | FF | FF | 0 | 0 | FF |
| 0 | 0 | 0 | FF | FF | FF | FF | 0 | FF | FF | 0 | FF |
| 0 | 0 | 0 | 0 | 0 | 0 | 0 | 0 | 0 | FF | FF | 0 |
| 0 | FF | FF | 0 | 0 | 0 | FF | FF | 0 | 0 | FF | FF |
| FF | 0 | 0 | 0 | FF | 0 | 0 | FF | 0 | 0 | 0 | FF |
| FF | FF | FF | 0 | 0 | FF | FF | 0 | 0 | FF | 0 | FF |
| 0 | 0 | FF | 0 | 0 | 0 | 0 | FF | FF | 0 | 0 | FF |
| 0 | 0 | 0 | FF | FF | FF | FF | 0 | FF | FF | 0 | FF |
| 0 | 0 | 0 | 0 | 0 | 0 | 0 | 0 | FF | FF | FF | 0 |

FIG. 8D

EDGE TRACING WITH HYSTERESIS THRESHOLDING

CROSS-REFERENCE TO RELATED APPLICATIONS

This application claims priority to and the benefit of, and incorporates herein by reference in its entirety, U.S. Provisional Patent Application No. 61/561,495, which was filed on Nov. 18, 2011.

FIELD OF THE INVENTION

In various embodiments, the present invention relates, in general, to image processing, and more specifically to tracing edges in images.

BACKGROUND

Image-processing techniques may be used to detect shapes (e.g., lines, squares, or circles) in an image. Shape detection usually includes two steps: edge detection and edge tracing (also known as edge linking). Edge detection is a well-known technique for locating pictorially meaningful discontinuities in grayscale levels that correspond to, for example, a boundary between two different regions in the image. Following edge detection, tracing procedures may be used to assemble detected edge pixels into larger edges that correspond more closely to the edges of objects in the original image. Once the edges in the image have been derived, well-established classification techniques, such as Fourier-shape descriptors and generalized Hough transforms, may be used to recognize an object in the image.

In traditional practice, a threshold is applied to intensity gradients of the image to decide whether edges are present. Pixels having intensity gradients greater than the threshold are marked as parts of an edge, while pixels having intensity gradients below the threshold are considered non-edge pixels. It is, however, difficult to specify a threshold that can clearly separate edge pixels and non-edge pixels. A more sophisticated edge detector uses hysteresis thresholding and two thresholds, $T_{low}$ and $T_{high}$, to detect the edges. Pixels having intensity gradients greater than $T_{high}$ are marked as strong-edge pixels while pixels having intensity gradients below $T_{low}$ are marked as non-edge pixels. Pixels having intensity gradients that are below $T_{high}$ but above $T_{low}$, called weak-edge pixels, are considered edge pixels only if they are "connected to" (e.g., neighboring) a pixel having an intensity gradient above $T_{high}$ (i.e., a strong-edge pixel). A continuous edge curve may thus be traced from weak-edge pixels in the image to strong-edge pixels, thereby reconstructing a larger edge having noisy or obscured portions. This method may provide better-defined edges in the image and allow for the tracing of faint edges (as long as a neighboring strong-edge pixel is identified).

Conventional edge-tracing systems and methods recursively trace the path of the edge pixels identified in an image. If a pixel is marked as an edge pixel, its neighboring pixels are scanned. As described above, the neighboring pixels are considered edge pixels if their intensity gradients are greater than $T_{low}$. The neighbor-scanning procedure repeats for all neighboring edge pixels (i.e., all neighbors having an intensity gradient greater than $T_{low}$). This recursive approach is thus time consuming and requires a large memory. Additionally, because of the random nature of scanning for the neighboring pixels and the unpredictability of the direction in which the edge may run, it is impossible to predict, in advance, which parts of the image are needed to detect a current edge, and thus the whole image must ordinarily be accessible locally.

Processors having small internal memories (e.g., digital-signal processors) cannot store the entire image (or information associated with the image, such as pixel labels) locally. Such processors, therefore, need to continually access slow system memory (e.g., external memory) to fetch additional portions of the image; this results in slow processing speeds for the edge-tracing algorithms. Consequently, there is a need to facilitate quick fetching of image information from local memory and processing of this information for purposes of edge tracing without using system memory.

SUMMARY

In various embodiments, the present invention relates to systems and methods for efficiently tracing edges in an image by accessing the image only in raster-scan order (e.g., left-to-right across each row and top-to-bottom for all the rows). The raster-scanned pixels in each row are classified into "strong-edge pixels," "weak-edge pixels," and "background pixels" in an input edge map using, for example, two thresholds, $T_{low}$ and $T_{high}$. Labels are then assigned to each pixel based on the classification thereof and the presence or absence of a neighboring edge pixel. Labels of each raster row are stored in the memory; only labels of the current scanned raster row and the prior-scanned row are needed to perform edge tracing. The memory requirement thus is very small, and memory space may be released upon the completion of a scan of a row to store labels in the next scanned raster row.

A "union-find" approach may be used to group labels based on the connectivity of pixels in the input edge map, thereby reducing the memory required to store the labels. Additionally, labels may be classified into two groups: active labels, which propagate in the map, and inactive labels, which do not propagate. The required internal memory may be reduced by moving the inactive labels to external memory. The "union-find" operation may then be applied only to the active labels, thereby avoiding random access to the map and thus reducing the processing time. A group of labels associated with strong-edge pixels is then identified as part of an edge, whereas a group of labels not associated with strong-edge pixels is discarded to further reduce the number of labels stored in the memory. This approach minimizes random memory access, allows prediction and pre-fetching of needed portions of the image into local memory, and processes only active labels; it may thereby quickly trace edges of the image using processors that may have small internal memories.

Accordingly, in one aspect, the invention pertains to a method for tracing edges of an image using hysteresis thresholding. The method includes (a) receiving an edge map of the image; (b) scanning a row of the edge map; (c) assigning a label to each edge pixel in the row based at least in part on the presence or absence of a neighboring edge pixel; (d) repeating steps (b) and (c) for each row in the edge map; (e) grouping contiguous labels; and (f) identifying groups belonging to strong-edge pixels. In various embodiments, a neighboring edge pixel is any of a left edge pixel, a top-left edge pixel, a top edge pixel, or a top-right edge pixel. The label assigned to each edge pixel in the raster row may be based at least in part on a direction in which the label is propagated from.

The labels may be stored in a table or data structure. If the labels are stored in a data structure, the data structure may include an entry, which, for example, includes an x-coordinate, a count number, and the label, representing a contiguous run of edge pixels. The label in the entry may be assigned based at least in part on the presence or absence of a second run of edge pixels neighboring the contiguous run of edge pixels. The data structure may include a hybrid data structure that includes a first disjoint-set data forest storing propagated labels and a second disjoint-set data forest storing non-propagated labels. Alternatively, the hybrid data structure may include a disjoint-set data forest storing propagated labels and an array storing non-propagated labels. The propagated labels may be assigned to slot numbers of a local memory using a modulo operator or the propagated labels' least significant bits associated with a width of the image. Additionally, the propagated labels may be grouped based at least in part on connectivity therebetween.

The label having a minimum value among all assigned numbers may be reserved for the strong-edge pixels. The reserved minimum number advantageously reduces the number of labels, avoids memory requirement for separately storing a list of strong labels and processing time for parsing the list of labels to determining whether a particular label is a strong-edge pixel, and ensures that the strong-edge label may not be replaced by other labels.

In another aspect, a system for tracing edges of an image using hysteresis thresholding includes a local memory and a processor connected to the local memory via a high-speed interface and connected to the main memory via a low-speed interface. The processor is configured to: (i) load a row of an edge map stored in a main memory into the local memory; (ii) assign a label to each pixel in the row based at least in part on the presence or absence of a neighboring edge pixel; (iii) repeat steps (i) and (ii) for each row in the edge map; (iv) group contiguous labels; and (v) identify groups belonging to strong-edge pixels.

The labels propagating in the edge map may be stored in the local memory, whereas the labels that do not propagate in the edge map may be stored in the local memory or the main memory. The local memory, for example, may be too small to store the entire edge map. In some embodiments, the processor is a digital-signal processor.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the following description, various embodiments of the present invention are described with reference to the following drawings, in which:

FIG. 5 depicts an equivalence map in accordance with an embodiment of the invention;

FIG. 8A depicts an updated label map in accordance with an embodiment of the invention;

FIG. 8B is an output edge map in accordance with an embodiment of the invention;

FIG. 8C depicts an edge map generated based on the labels of the runs in accordance with an embodiment of the invention;

FIG. 8D is an output edge map in accordance with an embodiment of the invention;

DETAILED DESCRIPTION

Figure 1:
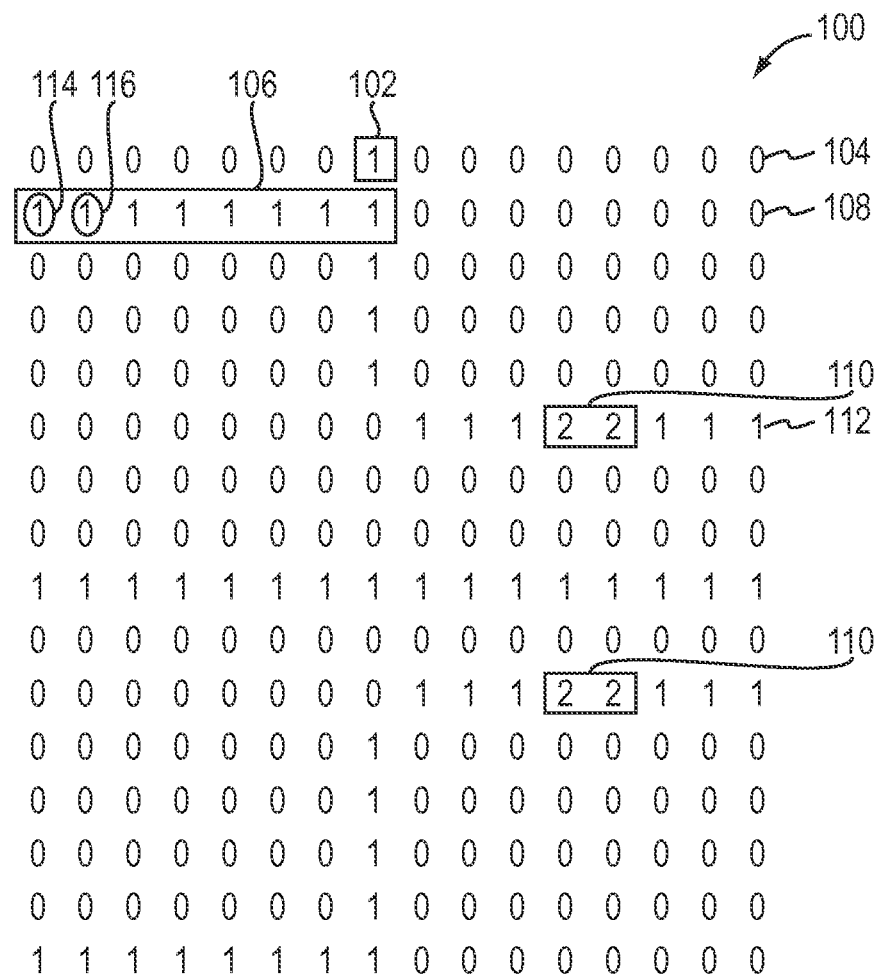
FIG. 1 is an input edge map.

FIG. 1 depicts an exemplary edge map 100 derived from a source image and, typically, received from an image source. The edge map 100 is a pixel-by-pixel mapping of the source image in which each entry (i.e., row/column value) in the edge map 100 corresponds to a pixel (or pixels) in the source image. The edge map classifies each pixel (or group of pixels) in the source image as a strong-edge pixel, weak-edge pixel, or non-edge pixel (marked in the edge map 100 as "2", "1," and "0", respectively). For example, a single weak-edge pixel 102 is present in a first row 104 of the edge map 100, and a plurality of weak-edge pixels 106 is present in a second row 108. Strong-edge pixels 110 appear in a sixth row 112. In one embodiment, the edge map 100 is generated from the source image by analyzing the intensities, gradients, and/or other factors in the source image against one or more thresholds (e.g., $T_{low}$ and $T_{high}$); the edge map 100 may also be received from an edge-analysis system.

A strong-edge pixel may correspond to a high-contrast boundary in the source image, and a weak-edge pixel may correspond to a low- or medium-contrast boundary in the source image. A non-edge pixel may correspond to regions of the source image unassociated with a boundary. The two thresholds $T_{low}$, $T_{high}$ may be predetermined and can be adjusted to reflect the quality of the contrast in the image. For example, the difference between $T_{low}$ and $T_{high}$ may be set at a low value when an image has poor contrast or at a high value when the contrast of the image is good. Lower threshold(s), however, may result in detection of more edges, and the resulting large number of edges may be susceptible to noise (i.e., some of the detected edges may not correspond to actual feature edges in the image). Conversely, a high threshold may miss subtle edges and result in fragmented boundaries within the image. The present invention is not limited to any particular value (or number) of the thresholds, however, nor must the thresholds be well-chosen for the invention to operate usefully; any thresholds suitable for a given image are within the scope of the present invention.

Edge map 100 is scanned (i.e., row by row) and the data therein is analyzed, as explained in greater detail below. The current discussion assumes a raster scan order of top-to-bottom (for rows) and left-to-right (for columns within each row), but the present invention is not limited to any particular orientation, direction or order of scanning; for example, bottom-to-top and right-to-left scanning may be employed. One of ordinary skill in the art will understand that different orientations, directions, and/or orders of scanning are within the scope of the current invention.

Figure 2:
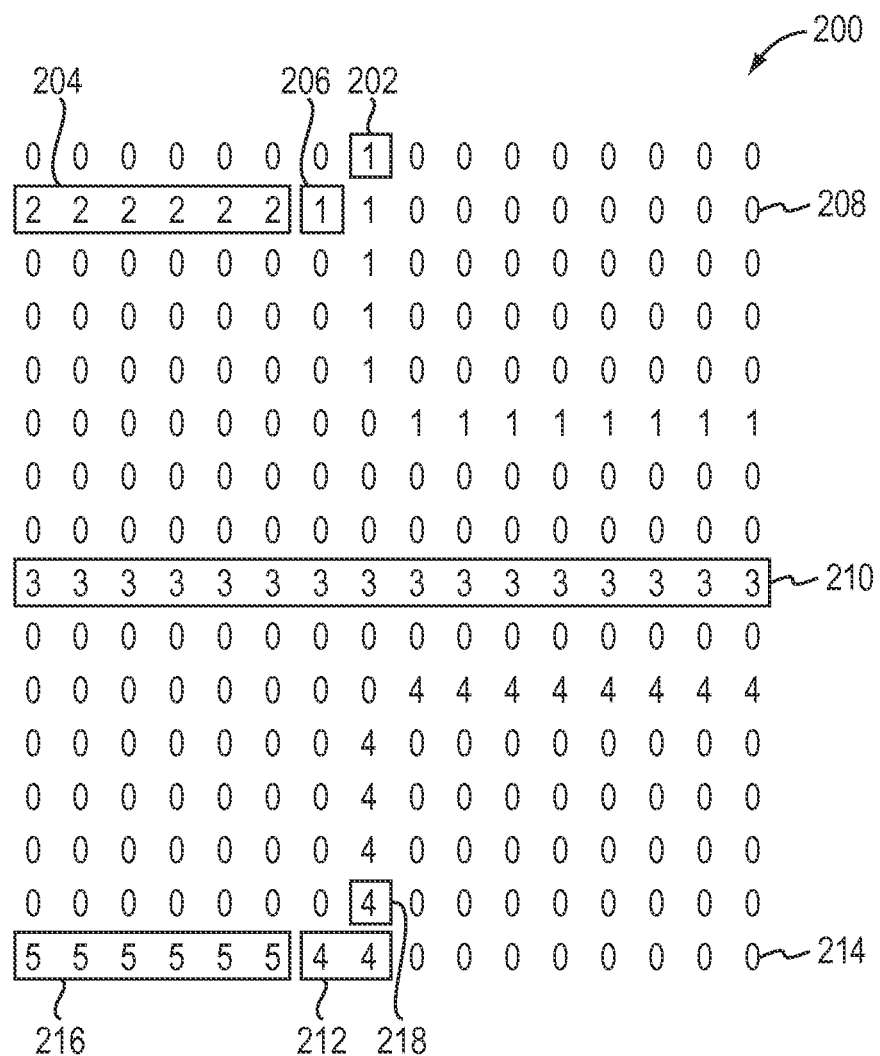
FIG. 2 depicts an exemplary label map based on the edge map in accordance with an embodiment of the invention.

With reference to FIG. 2, a first scanning pass is applied to the edge map 100 to generate a label map 200 (or a data structure, as further described below), i.e., labels are assigned to the edge pixels found in each scanned row. Each pixel in a row in the label map 200 may be initially assigned a default label (e.g., "0"); this label indicates that every pixel in the corresponding row in the edge map 100 is initially classified as a background pixel (or a root label, as further described below). Each row of the edge map 100 is examined for edge pixels (either strong or weak edges) and, as the edge pixels are discovered, labels are assigned to them. If the identified edge pixel is part of an already-existing group of edge pixels (as described in greater detail below), the group's already-existing label is applied to the new edge pixel. If, on the other hand, the edge pixel is the first of a new group, it is assigned a new, unique label.

Labels may be assigned using various approaches. In one embodiment, each row of the edge map 100 is scanned from left to right, and numeric labels (starting from a first label of "1") are assigned to each newly discovered edge pixel based on the presence or absence of an already-discovered (i.e., prior-scanned) neighboring edge pixel. For example, referring also to FIG. 1, the weak-edge pixel 102 is first encountered in the first row 104; because no neighboring pixels exist (at least, none that are yet known), the weak-edge pixel 102 is labeled "1" in the label map 200. In the second row 108 of the edge map 100, more edge pixels 106 are encountered; each is labeled "2" in the label map 200 because each has a neighboring edge pixel (namely, the previous pixel to the left of each current pixel).

Neighboring pixels can influence the label of a current pixel. In FIG. 2, the pixel 206 in the second row 208 in the label map 200 is labeled "1" instead of "2" because it has an "above" neighboring edge pixel 202 already assigned a label of "1." In various embodiments, neighboring edge pixels that influence a current pixel's label value may be located to the immediate left of the current pixel or may be an "above neighbor" of the current pixel (i.e., the pixels in the previously scanned row that are top-left, top, and top-right neighbors). Edge pixels having no prior-scanned neighboring edge pixels are assigned new labels; the new labels may be generated by incrementing the last assigned label by one (or by any other method of creating unique and monotonically increasing labels). Edge pixels having prior-scanned neighbors are labeled with the same label propagated from the prior-scanned neighbors. If, however, more than one label propagates to the current edge pixel, the label having the smallest number may be assigned to the current edge pixel and all other propagated higher numbers are considered equivalent to the minimum label.

Completion of the exemplary label map 200 includes assigning a label of "3" to the pixels 210 in the ninth row and assigning labels of "4" and "5" to the pixels in the eleventh through sixteenth rows. The existing label "4" is assigned to pixels 212 in the last row 214 because, although they are neighbors of pixels 216 labeled "5," they are also neighbors of a pixel 218 labeled "4" in a previous row (and 4, being less than 5, takes precedence).

The number of labels assigned with the above-described approach may be large when there are many separate edge-pixel groups, thereby increasing to an unacceptable degree the memory required to store the labels (e.g., a size greater than that of a fast, local memory). For example, assigning two bytes for each label results in a required memory size twice the size of the input image. In some embodiments, additional information may be encoded into the numeric labels, beyond their simple cardinal order, to reduce the number of total labels. For example, the numeric labels may be assigned to each edge pixel based on the location of a neighboring edge pixel from which a label value was inherited. For example, labels "1," "2," "3," and "4" may be assigned to edge pixels when the labels are propagated from "top-left," "top," "top-right," and "left" neighbors, respectively. If there is no neighboring edge pixel from which a current edge pixel can inherit a label, a value label of "5" may be assigned to this edge pixel. If the current pixel is a non-edge pixel, a label of "0" may be assigned. For example, with reference to FIGS. 1 and 3, the weak-edge pixels 102 and 114 in FIG. 1 receive a label of "5" (as indicated at 302, 304, respectively) in the label map 300 due to the absence of available labels from prior-scanned neighboring pixels. The weak-edge pixel 116 in FIG. 1 is assigned a label "4" (indicated at 306) in FIG. 3 because the label is propagated from the left neighbor 304. Similarly, edge pixels 308, 310, and 312 are assigned labels of "3," "2," and "1," respectively, because the labels are propagated from the "top-right", "top", and "top-left" neighboring pixels, respectively. This approach provides a limited number of labels assigned to the edge pixels (e.g., from "0" to "5"), regardless of the number of separate edge-pixel groups and, therefore, may reduce the size of required memory by a factor of four.

Figure 3:
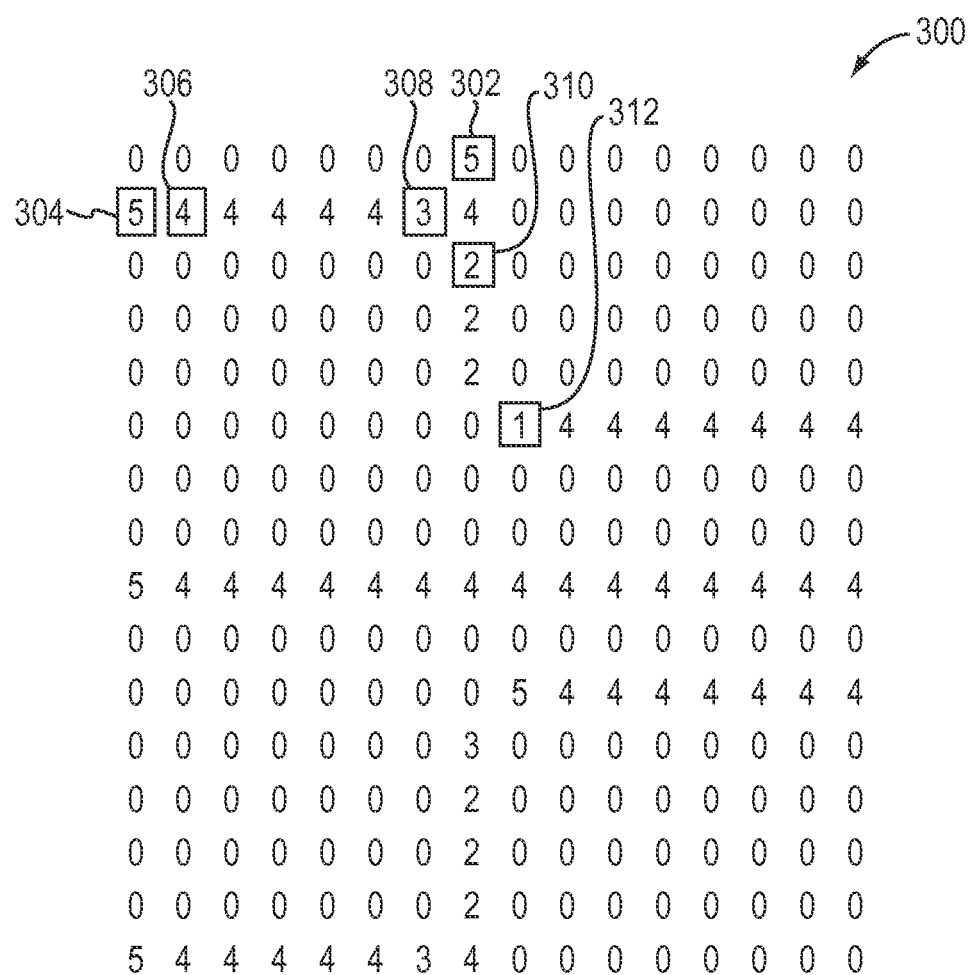
FIG. 3 is a directional label map in accordance with an embodiment of the invention.
Figure 4:
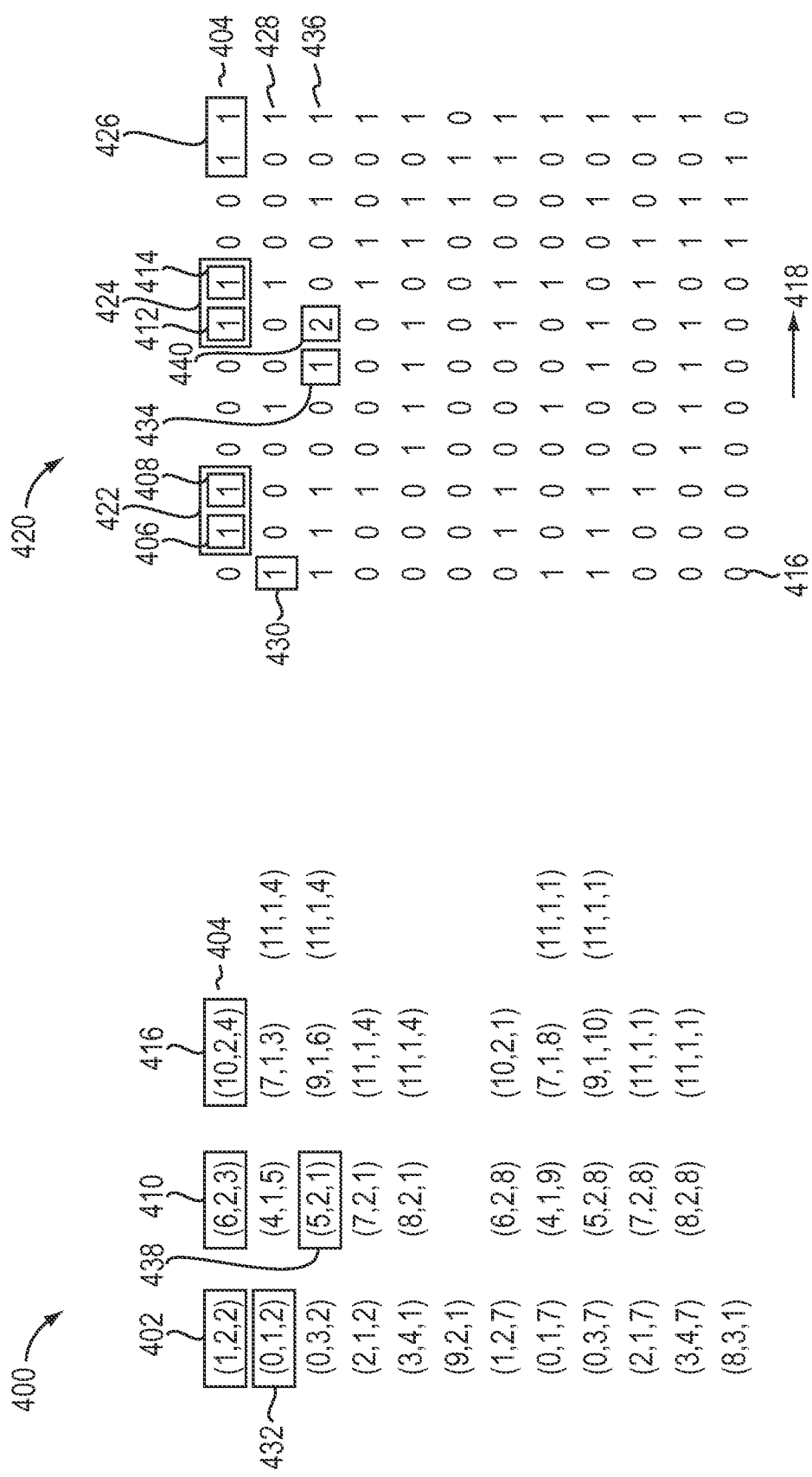
FIG. 4A depicts labels stored in a data structure in accordance with an embodiment of the invention.
FIG. 4B is another input edge map in accordance with an embodiment of the invention.

The assigned labels, however they are allotted, may be stored in a table map, as illustrated in FIGS. 2 and 3. In other embodiments, labels are assigned and stored in a data structure 400, as shown in FIG. 4A; non-edge pixels (and their corresponding data) are not stored, thereby reducing the overall memory requirement. Referring to FIG. 4A, each entry in the data structure (or "run") may contain three parameters: "x," "count," and "label," where x is the x-coordinate of the start of each new label, count is the number of pixels (or the length of the run) that the label propagates in a row, and label is the label assigned to the run, as further described below. FIG. 4A illustrates the data structure 400 derived from an input edge map depicted in FIG. 4B. For example, the run of (x, count, label)=(1, 2, 2) (indicated at 402) in the first row 404 of FIG. 4A represents a label "2" assigned to two consecutive edge pixels (i.e., count=2) 406 and 408 in FIG. 4B, starting with an x-coordinate of "1"; similarly, the run of (6, 2, 3) (indicated at 410) represents label "3" assigned to two consecutive pixels (i.e., count=2) 412 and 414 in FIG. 4B, starting with an x-coordinate of "6." As illustrated, the x-coordinate starts from 0 in the leftmost edge pixels (e.g., column 416) and incrementally increases as the scanned edge pixels move towards the right direction 418; the x-coordinate may, however, be chosen in other directions and/or orders.

Labels in the data structure or the label map, as described above, may be assigned based on the following representative set of principles. A unique label, in one embodiment the minimum of all assigned numbers (e.g., label "1") may be reserved for all strong-edge pixels (i.e., pixels having the value of "2" in the input edge maps 100, 420 in FIGS. 1 and 4B, respectively), thereby reducing the number of labels and avoiding memory requirements for separately storing a list of strong labels. The reserved minimum number avoids processing time spent parsing the list of labels to determine whether a particular label is a strong-edge pixel. Additionally, this minimum number ensures that the strong-edge label may not be replaced by other labels in the data structure 400 because, in the embodiment described above, the label having a smaller number takes precedence when two labels propagate to the same edge pixel. Consequently, labels assigned to the weak-edge pixels that have no neighboring edge pixels may start from "2" and incrementally increase the last assigned label by one (or by any other method of creating unique labels). For example, labels "2," "3," and "4" are assigned to separate groups 422, 424, and 426, respectively, in the corresponding runs 402, 410, and 416, respectively. In the second row 428 of the edge map 420, a label "2" is assigned to the edge pixel 430, as shown in run 432 of the data structure 400, because it has a neighboring edge pixel 406 whose assigned label is "2," as shown in run 402. The edge pixel 434 in the third row 436 of the edge map 420 is assigned a label "1," as shown in run 438 of the data structure 400, because it has a neighboring strong-edge pixel 440 already assigned a label of "1."

The presence of neighboring edge pixels in different raster-scanned rows may be determined (and the proper labels applied) based on the x-coordinates and the count numbers. For example, run "1" having ($x_1$, $count_1$, $label_1$) and run "2" having ($x_2$, $count_2$, $label_2$) in two consecutive rows are determined to be not connected (i.e., not part of the same group) if the x-coordinate of run "1" plus the length thereof is smaller than the x-coordinate of run "2" (i.e., $x_1+count_1<x_2$) or if the x-coordinate of run "2" plus the length thereof is smaller than the x-coordinate of run "1" (i.e., $x_2+count_2<x_1$); whereas the two runs are considered connected if neither of these two conditions are met. Separate runs in the same raster-scanned row are not connected, by definition, and thus not neighbors. As a result, each run in the data structure 400 may include a label assigned based on the representative set of following principles: (i) a label with minimum number is reserved for the strong-edge pixels; (ii) runs having no prior-scanned neighboring runs and containing no strong-edge pixels may be assigned with new labels; the new labels are generated by, for example, incrementing the last assigned label by one; (iii) a newly generated label is compared against existing labels and, if a conflict is detected, the new label is further incremented and checked again until a conflict-free label (i.e., the label points to a free storage slot) is generated; (iv) runs having prior-scanned neighbors but containing no strong-edge pixels are labeled with the same label propagated from the prior-scanned neighbors; and (v) if more than one label propagates to the current run, the label that has the smallest number is assigned to the current run and all other propagated higher numbers are considered equivalent to the smallest number. Only information about the runs in the current and previous rows may be needed in the memory during processing; the memory requirement thus is very modest.

Figure 5:
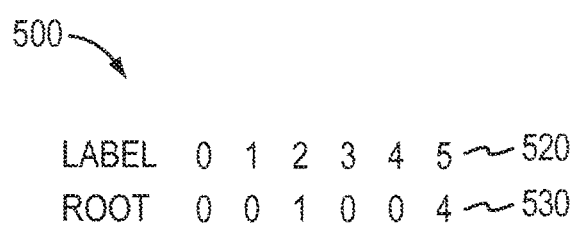

In a fourth step of the embodiment under discussion, assigned labels may be grouped together based on the connectivity of the edge pixels or the runs. When two labels propagate to a same edge pixel, the two labels may be considered the same and belong to the same group. For example, because labels "1" and "2" both propagate to the edge pixel 206 in FIG. 2, the groups of pixels labeled "1" and "2" may be merged into a single group having a label of "1" and label "2" is defined as a child label of the parent label "1." Similarly, the groups of pixels labeled "4" and "5" in FIG. 2 may be merged into a single group having a label of "4"; label "5" is therefore defined as a child label of the parent label "4." The equivalent minimum value of a label in each group is defined as a root label; the merged label information and the root labels may then be stored in an equivalence map 500 of FIG. 5 and/or an updated label map. The equivalence map 500 may be a vector array; the first row 520 of the array, for example, may be the set of assigned labels, and the second row 530 may represent their corresponding root labels thereof. Note that value "0" in the equivalence map 500 indicates that the label itself is the root label.

Edge pixels or runs to which labels are assigned may be connected together if the assigned labels are in the same group and thus considered equivalent, whereas edges pixels or runs may be disconnected if their assigned labels fall into separate groups. The group of the assigned label and its root label may be identified using (e.g.) a "union-find" approach. The union-find approach may perform two operations: find (i.e., determining which group a particular label is in) and union (i.e., combining/merging two adjacent groups into a single group). If two labels propagate to the same edge pixel (or run), the union-find approach may recursively trace the labels in the equivalence map (or label map) until their root labels are found. If the root labels belong to two separate groups, the two groups are combined into a single group, thereby combining their edge pixels (one of the root labels, such as the root label corresponding to the smaller group, may be defined as the parent of the other root label).

Figure 6A:
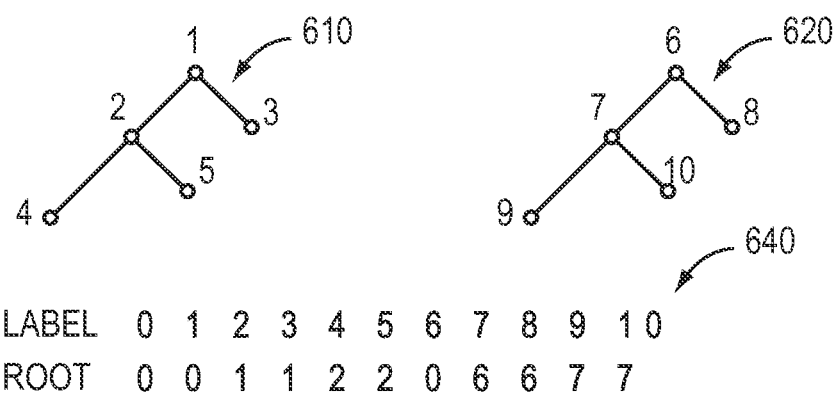
FIG. 6A depicts a tree structure and equivalence map of assigned labels in a prior art system.
Figure 6B:
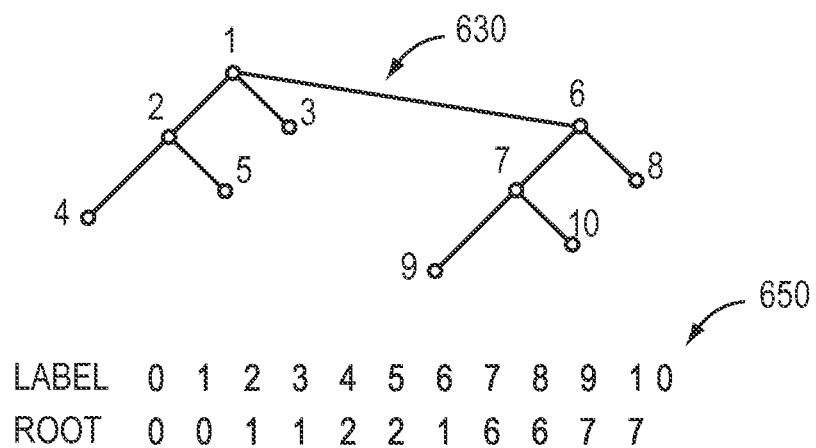
FIG. 6B depicts a merged tree structure and an updated equivalence map of assigned labels in a prior art system.

The continuity of the combined groups may be vertical, horizontal, and/or diagonal. The relationship between the group(s) of labels may be constituted as, for example, a tree structure 610, 620 in FIG. 6A. Each node in the tree structure represents a label and holds a reference to its parent label. An edge map that has a large number of assigned labels, for example, FIG. 4B, may include multiple tree structures (i.e., a disjoint-set forest), as depicted in FIG. 6A. When a new connection between two labels assigned to the same edge pixel or run occurs, the equivalence map (or data structure) may be recursively traced until the root labels of the trees to which the two labels belong to are found. If two labels belong to different trees, as described above, the root label having a lower number is set as the parent label of the other. For example, with reference to FIG. 6B, tree structure 630 is the join set of the merged groups 610 and 620 in FIG. 6A and label "1" is considered to be the root label of label "6." The equivalence map 640 in FIG. 6A may then be updated to become the map 650 in FIG. 6B.

Figure 7A:
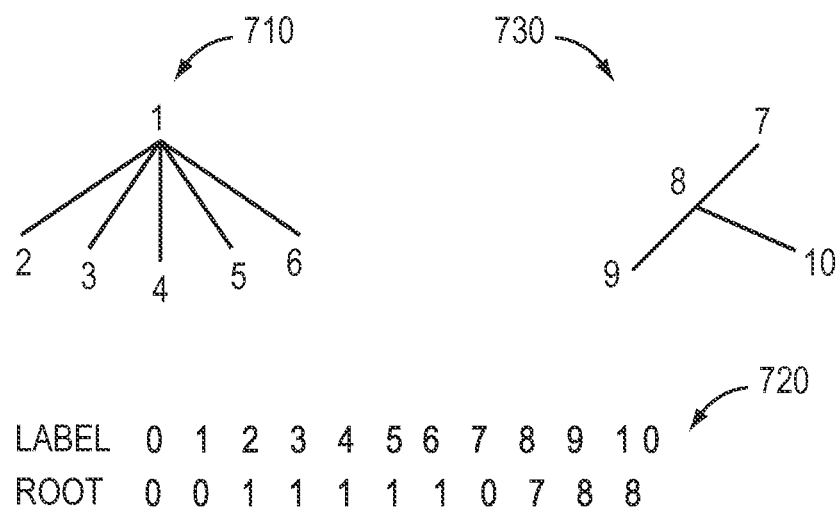
FIG. 7A depicts a tree structure and equivalence map of assigned labels in accordance with an embodiment of the invention.
Figure 7B:
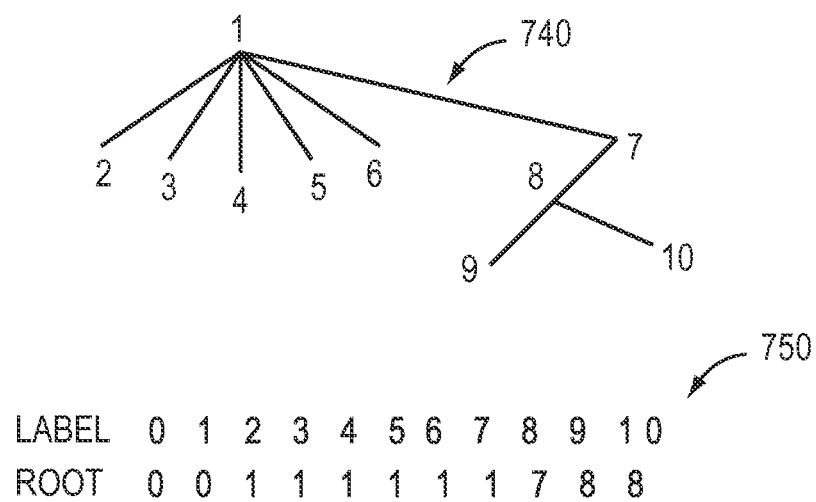
FIG. 7B depicts a merged tree structure and an updated equivalence map of assigned labels in accordance with an embodiment of the invention.

Tracking the root label of each assigned label and determining the group it belongs to, however, may require a large memory when the number of the assigned labels and/or the depth of the trees increase. Additionally, flattening out the entire tree (i.e., updating the assigned labels with their root labels) may be time consuming when the number of label is large. Further, the nature of the set of labels that propagates in the label map (or data structure) may depend on the acquired input map and thus be impossible to predict in advance. Using a single disjoint-set forest as the data structure (as shown in, e.g., FIGS. 6A and 6B) may result in random access to the label map (or data structure), thus raising the processing time—especially if the map or data structure is too large to fit into a fast, local memory. In one embodiment, the connectivity of edge pixels is used in the label map (such as the map shown in FIG. 2) and/or the runs in the data structure (such as the data structure of FIG. 4A) to determine the active parts (i.e., the labels that propagate) of the tree structure. The active parts of the tree are then flattened out after processing each row. Because this approach updates only the active labels (i.e., propagated labels) and the flattening time is therefore minimal, the entire processing time of an acquired image may be significantly reduced. Additionally, labels assigned to the edge pixels (or runs) in the last row of the label map (or data structure) may be replaced with their root labels such that only the root labels propagate through the label map (or data structure); this further decreases the processed number of labels and thereby reduces the processing time. Referring to FIG. 7A, because labels "2," "3," "4," "5," and "6" are all connected to label "1" in the data structure 400, they may be flattened out with their parent label (or root label) "1," as shown in the tree structure 710 and the equivalence map 720 of FIG. 7A. Similarly, in the tree structure 730, the parent labels of labels "8," "9," and "10" are labels "7", "8," and "8", respectively. After processing the last row of the edge map, the two disjoint trees 710 and 730 may be merged into a group; label "7" may then set to be the child label of the parent label (or root label) "1" due to its larger number. The merged tree structure is illustrated in 740 of FIG. 7B, and the equivalence map 750 is updated accordingly.

As described above, the disjoint-set forest data structure used in conventional edge tracing techniques may result in random accesses to the label map and/or require a large memory. To solve this problem, in one embodiment, a hybrid data structure in the current invention is used in which the propagated labels (i.e., active labels) are separated from the non-propagated labels (i.e., inactive labels) in the label map or data structure. Because only root labels propagate, the union-find operation is applied only to the active root labels presented in each row that is currently processed. The active labels may be stored in an active correspondence map in which the disjoint-set data forest is used; whereas the inactive labels may be stored in an inactive correspondence map in which either a disjoint-set data forest or an array of (label, parent label) is used (when, e.g., there is no free slot available in the disjoint-set data structure, as further described below). Because the inactive correspondence map generally has limited storage space, a single storage slot may be shared by multiple labels. In one embodiment, a newly generated label in the inactive correspondence map is compared against existing labels and, if a conflict is detected, the new label is further incremented and checked again until a conflict-free label is generated. The set of labels may thus be monotonically increasing but may include gaps in the integers used for the labels.

The total number of labels, however, may be larger than the number of available storage slots in an active correspondence map; a "many-to-one" function may be used to map the active labels to the available slots. In one embodiment, the slot number for each label N is calculated as N×mod(L), wherein mod is the modulo operator and L is the number of available slots. In another embodiment, the many-to-one function is performed using the LSBs of the labels, and the size of the disjoint-set forest is chosen to be a power function such as pow(2;B), wherein B is defined as ceil($\log_2$(M/2)) (in which M/2 is the maximum number of the active labels in each row and M is the width of the image). Each label may then be assigned to a slot number "B LSBs" of the label in the correspondence map and be accessed therethrough. A new label may be generated by incrementing the number of the current label counter; numbers that are in conflict with the existing active labels already assigned to slot numbers of "B LSBs" of the labels are excluded. By excluding or incrementing past already-assigned active labels, two active labels are not assigned to the same slot in the active correspondence map. In various embodiments, when there is no free slot available in the disjoint-set data structure, all inactive labels are stored as (e.g.) a (label, parent label) array and moved to, for example, an external memory, thereby releasing free space in the internal/local memory. Additionally, root labels that do not propagate may be moved to an alternate data structure and marked with a non-zero value to indicate it is a free slot.

Figure 8A:
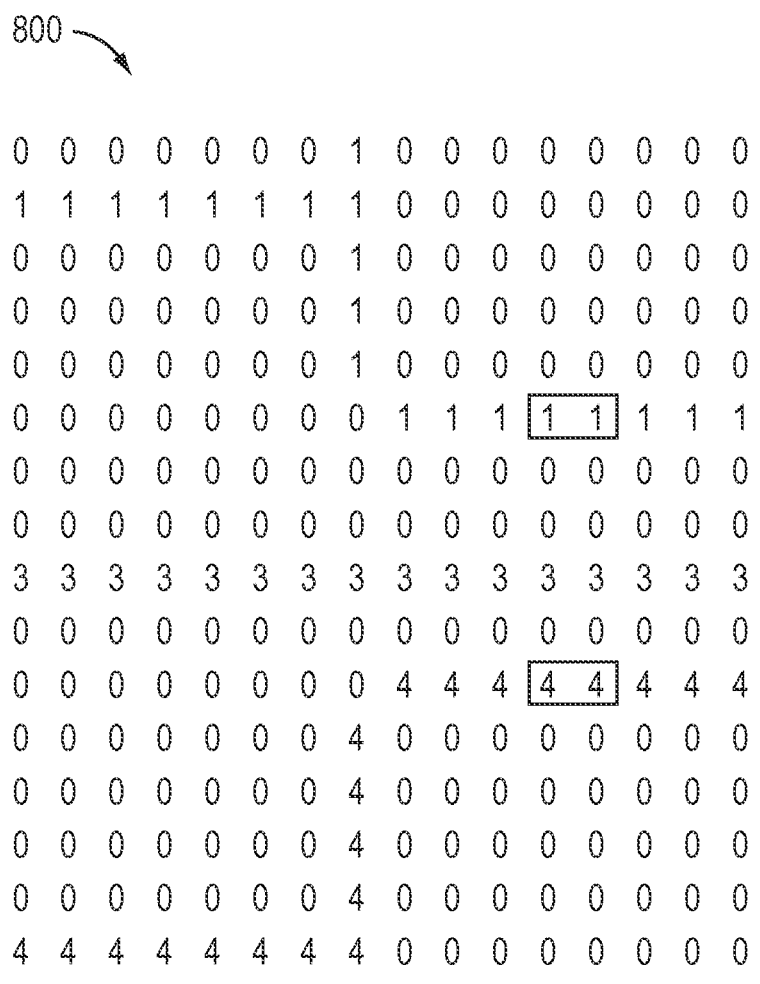

In a fifth step of the embodiment under discussion, a second pass may be applied to determine the traced edges; for example, groups of labels that are associated with strong-edge pixels may be identified as traced edges. Referring to the updated label map 800 in FIG. 8A and to the edge map 100 in FIG. 1, identified groups of labels are correlated with the positions of the strong-edge pixels (e.g., strong-edge pixels 110). Groups of labels in the label map 800 that coincide or connect with strong-edge pixels in the edge map 100 are marked "FF" in the updated edge map 810 of FIG. 8B, and groups of labels that do not coincide or connect to strong-edge pixels, are marked "0." The groups of pixels labeled "3" in the updated correspondence map 810 are not marked "FF" as traced edges at least because they have no corresponding strong-edge pixels in the edge map 100. If data structure 400 in FIG. 4A is used, pixels in the runs that contain strong-edge pixels (i.e., label "1") may be identified as traced edges and marked "FF" in the updated edge map 820 of FIG. 8C. Pixels in the runs where new labels are generated are marked "A" and pixels in the rest of runs in the data structure 400 are marked "B", as depicted in map 820 of FIG. 8C. A remarking process may be necessary to determine if runs marked "A" and/or "B" are parts of the edge curves. For example, for a run marked as "A" in map 820, a new label may be generated by incrementing the current label counter and the parent label of the new generated label may then be searched in the equivalence map. If the parent label thereof is "1", it indicates such a run is connected to a strong-edge pixel and may be identified as a traced edge, thereby marked "FF"; whereas runs whose parent labels are not "1" may be marked "0", as depicted in the updated edge map 830 of FIG. 8D. Runs marked "B" may be remarked based on the mark of any of their neighboring pixels in the previously scanned row since they are all connected. Note that the second pass may be similarly applied to the inactive correspondence map where inactive labels are stored as an array of (label, parent label) or as disjoint-set data in which gaps in the inactive correspondence map are removed. In one embodiment, labels in the inactive correspondence map are generated by incrementing the label counter without checking for conflicting storage slots; this significantly reduces the processing time. Finally, runs marked "FF" in the updated edge map 810, 830 are deemed to be traced edges.

Figure 9:
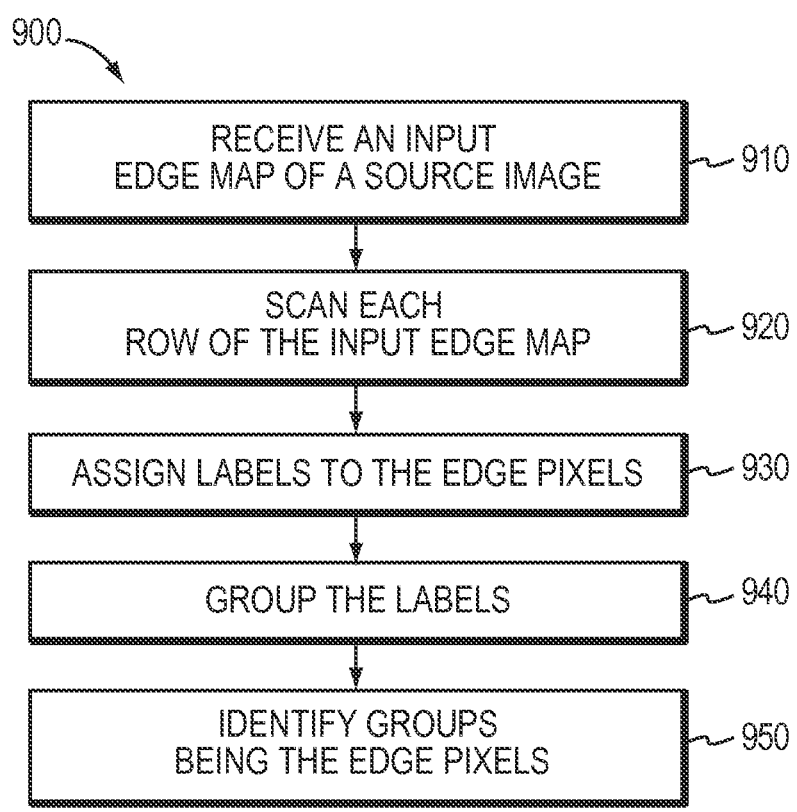
FIG. 9 is a method for tracing edges of an image in accordance with an embodiment of the invention.

A representative method 900 for edge tracing in accordance with embodiments of the current invention is shown in FIG. 9. In a first step 910, an edge map based upon a source image is received; the edge map may, for example, be generated using hysteresis thresholding having two thresholds. In a second step 920, raster-scanning is performed on each row of the input edge map. In a third step 930, a label is assigned to each edge pixel in the raster row based on the presence or absence of a neighboring edge pixel. The labels are then stored in a table map or a data structure; contiguous labels (i.e., pixels that are connected) are then grouped into sets (in a fourth step 940). The root label of each label is determined and each group is identified as edge pixels or non-edge pixels (in a fifth step 950) based on the value of the root label.

Figure 10:
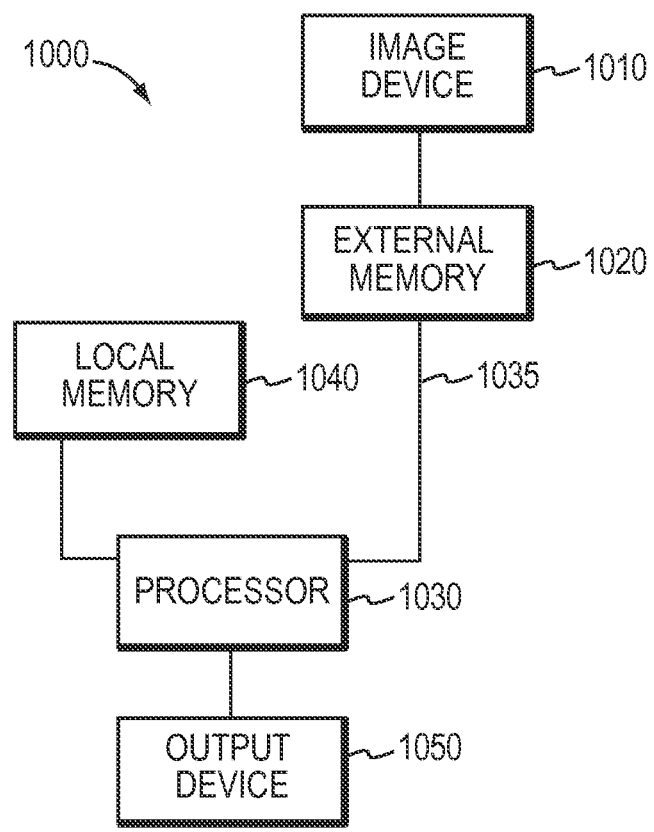
FIG. 10 a system of tracing edges of an image in accordance with an embodiment of the invention.

A system 1000 for edge tracing in accordance with embodiments of the current invention is shown in FIG. 10. An image acquired with an image device 1010, such as a digital camera, is stored in external memory 1020. The external memory 1020, such as random-access-memory (RAM) or a hard disk, may be located remote to the processor 1030 and is connected via a low-speed link 1035. The external memory 1020, which may be an order of magnitude larger than the local memory 1040, requires many more clock cycles (e.g., 100 cycles) than the local memory 1040 for storage and retrieval of data by the processor 1030 (e.g., 1 cycle for local cache access). Note that local memory 1040 herein is used to refer to the fast memory, but is not meant to be limiting and may apply to any kind of register file, cache, or any other type of memory closer in hierarchy to the processor 1030 than the large, slow external memory 1020. Information about a portion of the image scanned in a raster order is stored in local memory 1040 and fetched by the processor 1030 to generate an edge map. The processor 1030 assigns labels to each edge pixel of the image and groups the labels thereof. The processor 1030 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention. Groups of labels are then identified as being edge pixels or non-edge pixels; the results are stored in the external memory 1020, local memory 1040, and/or outputted to a device 1050.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method for tracing edges of an image using hysteresis thresholding, the method comprising:
    (a) receiving an edge map of the image;
    (b) scanning a row of the edge map;
    (c) assigning a label to each edge pixel in the row based at least in part on the presence or absence of a neighboring edge pixel, wherein the label having a minimum value among all assigned numbers is reserved for the strong-edge pixels;
    (d) repeating steps (b) and (c) for each row in the edge map;
    (e) grouping contiguous labels; and
    (f) identifying groups belonging to strong-edge pixels.

2. The method of claim 1, wherein the neighboring edge pixel is any of a left edge pixel, a top-left edge pixel, a top edge pixel, or a top-right edge pixel.

3. The method of claim 1, wherein the labels are stored in a table or data structure.

4. The method of claim 3, wherein the data structure comprises an entry representing a contiguous run of edge pixels.

5. The method of claim 4, wherein the entry comprises an x-coordinate, a count number, and the label.

6. The method of claim 5, further comprising assigning the label in the entry based at least in part on the presence or absence of a second run of edge pixels neighboring the contiguous run of edge pixels.

7. The method of claim 4, wherein the data structure comprises a hybrid data structure.

8. The method of claim 7, wherein the hybrid data structure comprises a first disjoint-set data forest storing propagated labels and a second disjoint-set data forest storing non-propagated labels.

9. The method of claim 7, wherein the hybrid data structure comprises a disjoint-set data forest storing propagated labels and an array storing non-propagated labels.

10. The method of claim 8, wherein the propagated labels are assigned to slot numbers of a local memory using a modulo operator.

11. The method of claim 8, wherein the propagated labels are assigned to slot numbers of a local memory slots using the propagated labels' least significant bits associated with a width of the image.

12. The method of claim 8, further comprising grouping the propagated labels based at least in part on connectivity therebetween.

13. The method of claim 1, further comprising assigning a label to each edge pixel in the raster row based at least in part on a direction in which the label is propagated from.

14. A system for tracing edges of an image using hysteresis thresholding, the system comprising:
    a processor configured to:
    (i) load a row of an edge map;
    (ii) assign a label to each pixel in the row based at least in part on the presence or absence of a neighboring edge pixel, wherein the label having a minimum value among all assigned numbers is reserved for the strong-edge pixels;
    (iii) repeat steps (i) and (ii) for each row in the edge map;
    (iv) group contiguous labels; and
    (v) identify groups belonging to strong-edge pixels.

15. The system of claim 14, wherein the processor is configured to store labels propagating in the edge map in an internal memory.

16. The system of claim 14, wherein the processor is configured to store labels that do not propagate in the edge map in an external memory.

17. The system of claim 14, wherein the processor is configured to load a portion of the edge map into an internal memory from an external memory.

18. The system of claim 14, wherein the processor is a digital-signal processor.

19. The method of claim 9, wherein the propagated labels are assigned to slot numbers of a local memory using a modulo operator.

20. The method of claim 9, wherein the propagated labels are assigned to slot numbers of a local memory slots using the propagated labels' least significant bits associated with a width of the image.

21. The method of claim 9, further comprising grouping the propagated labels based at least in part on connectivity therebetween.

22. A system for tracing edges of an image using hysteresis thresholding, the system comprising:
    means for assigning a label to each pixel in a row of an edge map based at least in part on the presence or absence of a neighboring edge pixel, wherein the label having a minimum value among all assigned numbers is reserved for the strong-edge pixels, wherein the assigning is performed for each row in the edge map;
    means for grouping contiguous labels; and
    means for identifying groups belonging to strong-edge pixels.

23. The system of claim 22, further including means for loading each row of The edge map from an external memory to an internal memory.

24. The system of claim 22, further including means for storing labels propagating in the edge map and labels that do not propagate in the edge map.

\* \* \* \* \*